(12) United States Patent
Chan et al.

(10) Patent No.: US 7,528,552 B2
(45) Date of Patent: May 5, 2009

(54) POWER TRANSFORMER COMBINED WITH BALANCE WINDINGS AND APPLICATION CIRCUITS THEREOF

(75) Inventors: Chun-Kong Chan, Hsi Chih (TW); Jeng-Shong Wang, Hsin Chuang (TW)

(73) Assignee: Lien Chang Electronic Enterprise Co., Ltd., Taipei County (TW)

( * ) Notice: Subject to any disclaimer, the term of this patent is extended or adjusted under 35 U.S.C. 154(b) by 335 days.

(21) Appl. No.: 11/320,875

(22) Filed: Dec. 30, 2005

(65) Prior Publication Data

US 2007/0152599 A1     Jul. 5, 2007

(51) Int. Cl.
*H05B 37/00*     (2006.01)

(52) U.S. Cl. ................ 315/282; 315/274; 315/276; 315/279

(58) Field of Classification Search .......... 315/274–289
See application file for complete search history.

(56) References Cited

U.S. PATENT DOCUMENTS 7,365,501 B2 *   4/2008   Ushijima et al. ............ 315/278

* cited by examiner

*Primary Examiner*—Tuyet Vo
(74) *Attorney, Agent, or Firm*—Rosenberg, Klein & Lee

(57) ABSTRACT

A power transformer combined with balance windings is used for driving a CCFL. The power transformer makes use of a ferrite core structure to achieve a closed magnetic circuit, and is combined with balance windings. When used in application circuits, the power transformer combined with balance windings can provide stable induction voltages and balance load currents to CCFLs to enhance the luminous efficiency and uniformity of the CCFLs, thereby improving the drawbacks of a irregular current flowing through the CCFLs and too high a manufacturing cost of conventional CCFL application circuits.

13 Claims, 14 Drawing Sheets

US 7,528,552 B2

POWER TRANSFORMER COMBINED WITH BALANCE WINDINGS AND APPLICATION CIRCUITS THEREOF

BACKGROUND OF THE INVENTION

1. Field of the invention

The present invention relates to a power transformer combined with balance windings and application circuits thereof and, more particularly, to a power transformer and application circuits thereof, which provide stable induction voltages and balance load currents to CCFLs to drive the CCFLs so as to enhance the luminous efficiency and uniformity of the CCFLs.

2. Description of Related Art

An ordinary LCD panel utilizes cold cathode fluorescent lamps (CCFLs) as its backlight. Generally speaking, an inverter circuit is used to drive the CCFLs. In order to meet the requirement of a high voltage output, however, a high frequency transformer is adopted to drive the CCFLs.

As shown in FIG. 1, a prior art high frequency transformer is composed of a bobbin 1a, a first ferrite core 1b and a second ferrite core 1c. A primary winding region 1d and a secondary winding region 1e are formed on the bobbin 1a.

As shown in FIG. 1, a secondary winding 1g is wound around a plurality of separation grooves 1h projectively disposed at the side edge of the bobbin 1a to form the secondary winding region 1e, and a primary winding 1f is wound around other regions of the bobbin 1a to form the primary winding region 1d. The prior art high frequency transformer can thus be connected to a power source and a load. With the gradual increase of the size of LCD panel, however, the length and quantity of CCFLs increase therewith. Therefore, the required drive voltage of the transformer also increases therewith. Based on the voltage division principle of the separation grooves 1h, it is necessary to provide a corresponding number of separation grooves 1h according to the magnitude of the voltage used so as to enhance the reliability of product.

As shown in FIG. 2, because the impedances of the CCFLs 2a and 2b show negative temperature dependence, their impedances drop due to an increase in temperatures after conduction. According to the ideal usage state of load, a secondary winding 1g is often correspondingly in shunt with the CCFLs 2a and 2b in consideration of cost. The impedances of the CCFLs 2a and 2b, however, are different. Therefore, a current division effect easily arises at the lamp ends of the CCFLs 2a and 2b to cause uneven currents of the CCFLs 2a and 2b, hence resulting in a too large a difference in their brightness.

As shown in FIGS. 3A and 3B, in order to conquer the above problem of uneven currents of the CCFLs 2a and 2b, a matched balance winding 3 is generally added to accomplish mutual current induction of the CCFLs 2a and 2b so as to acquire more balanced currents, thereby effectively improving the brightness. However, adding a matched balance winding 3 not only increases the cost, but also limits the space usage of a circuit board, hence in practice it is not a good design.

Besides, as shown in FIG. 3, if high voltage capacitors C1 and C2 in FIG. 2 are replaced with inductive elements L1 and L2, the object of reducing the current division effect can also be achieved. When a prior art power transformer is used to drive several lamps, the magnitude of current used multiplies with the number of lamps. The diameter of wire used at the secondary side thus increases to make the space of the winding region insufficient. There is therefore no choice but to enlarge the winding region. But adopting a larger power transformer raises costs. Therefore, in consideration of the characteristics of CCFLs and the cost, balance windings are combined in a power transformer in the present invention to improve the above drawbacks of prior art drive circuits.

SUMMARY OF THE INVENTION

An object of the present invention is to provide a power transformer combined with balance windings and application circuits thereof. The power transformer is used to drive CCFLs and provide stable induction voltages and balanced load currents to the CCFLs so as to enhance the luminous efficiency and uniformity of the CCFLs.

To achieve the above object, a power transformer combined with balance windings according to a first preferred embodiment of the present invention comprises a ferrite core, a first bobbin and a second bobbin. The ferrite core has a first closed ferrite and a second closed ferrite coupled together. The first bobbin has a first hollow through portion, a low voltage winding region and a high voltage winding region. The first hollow through portion can receive a side bar of the first closed ferrite. A low voltage winding is wound around the low voltage winding region. A high voltage winding is wound around the high voltage winding region. The second bobbin has a second hollow through portion, a first winding region and a second winding region. The second hollow through portion can receive a side bar of the second closed ferrite. A first balance winding is wound around the first winding region. A second balance winding is wound around the second winding region.

When power is introduced from the low voltage winding of the power transformer combined with balance windings, magnetic flux is generated in the first closed ferrite core. At this time, magnetic coupling is generated between the low voltage winding region and the high voltage winding region on the first bobbin to acquire a voltage boost effect according to the turn ratio of the high voltage winding and the low voltage winding. The magnetic fluxes generated by the currents flowing through the first balance winding and the second balance winding on the second bobbin will induce each other in the second closed ferrite core to balance the currents flowing through CCFLs after the CCFLs are connected.

An application circuit of the power transformer combined with balance windings according to the first preferred embodiment of the present invention comprises a power transformer combined with balance windings, a pulse width modulation (PWM) controller and a power switch. The power transformer combined with balance windings has a low voltage winding, a high voltage winding, a first balance winding and a second balance winding. The high voltage winding is connected to the first balance winding and the second balance winding. The first balance winding and the second balance winding are connected to two CCFLs. The PWM controller is connected to the two CCFLs and receives a current signal from the two CCFLs and outputs a modulation signal. The power switch is connected to the PWM controller and the low voltage winding. The power switch is controlled by the modulation signal to periodically lead an input voltage into the low voltage winding to keep lamp brightness uniform.

Another application circuit of the power transformer combined with balance windings according to the first preferred embodiment of the present invention comprises a power transformer combined with balance windings, a PWM controller and a power switch. The power transformer combined with balance windings has a low voltage winding, a high voltage winding, a first balance winding and a second balance winding. The high voltage winding is connected to two CCFLs. The two CCFLs are connected to the first balance winding and the second balance winding. The PWM controller is connected to the first balance winding and the second balance winding and receives a current signal from the first balance winding and the second balance winding and outputs a modulation signal. The power switch is connected to the PWM controller and the low voltage winding. The power switch is controlled by the modulation signal to periodically lead an input voltage into the low voltage winding to keep lamp brightness uniform.

To achieve the above object, a power transformer combined with balance windings according to a second preferred embodiment of the present invention comprises a first closed ferrite core, at least a second closed ferrite core, a first bobbin and at least a second bobbin. The second closed ferrite cores are coupled with the first closed ferrite core. The first bobbin has a first hollow through portion, a low voltage winding region and at least one high voltage winding region. The first hollow through portion can receive a side bar of the first closed ferrite core. A low voltage winding is wound around the low voltage winding region. A high voltage winding is wound around each high voltage winding region. Each second bobbin has a second hollow through portion, a first winding region and a second winding region. Each second hollow through portion can receive a side bar of one second closed ferrite core. A first balance winding is wound around each first winding region. A second balance winding is wound around each second winding region.

When power is introduced from the low voltage winding of the power transformer combined with balance windings, magnetic flux is generated in the first closed ferrite core. At this time, magnetic coupling are generated between the low voltage winding region and the high voltage winding regions on the first bobbin to acquire a voltage boost effect according to the turn ratios of the high voltage windings and the low voltage winding. The magnetic fluxes generated by the currents flowing through the first balance winding and the second balance winding on each second bobbin will induce each other in the second closed ferrite core to balance the currents flowing through CCFLs after the CCFLs are connected.

An application circuit of the power transformer combined with balance windings according to the second preferred embodiment of the present invention comprises a power transformer combined with balance windings, a PWM controller and a power switch. The power transformer combined with balance windings has a low voltage winding, at least a high voltage winding, at least a first balance winding and at least a second balance winding. Each high voltage winding is connected to the first balance winding and the second balance winding wound around the same second bobbin and then to two CCFLs. The PWM controller is connected to the two CCFLs and receives a current signal from the two CCFLs and outputs a modulation signal. The power switch is connected to the PWM controller and the low voltage winding. The power switch is controlled by the modulation signal to periodically lead an input voltage into the low voltage winding to keep lamp brightness uniform.

Another application circuit of the power transformer combined with balance windings according to the second preferred embodiment of the present invention comprises a power transformer combined with balance windings, a PWM controller and a power switch. The power transformer combined with balance windings has a low voltage winding, at least a high voltage winding, at least a first balance winding and at least a second balance winding. Each high voltage winding is connected to two CCFLs and then to the first balance winding and the second balance winding wound around the same second bobbin. The PWM controller is connected to the first balance winding and the second balance winding and receives a current signal from the first balance winding and the second balance winding and outputs a modulation signal. The power switch is connected to the PWM controller and the low voltage winding. The power switch is controlled by the modulation signal to periodically lead an input voltage into the low voltage winding to keep lamp brightness uniform.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
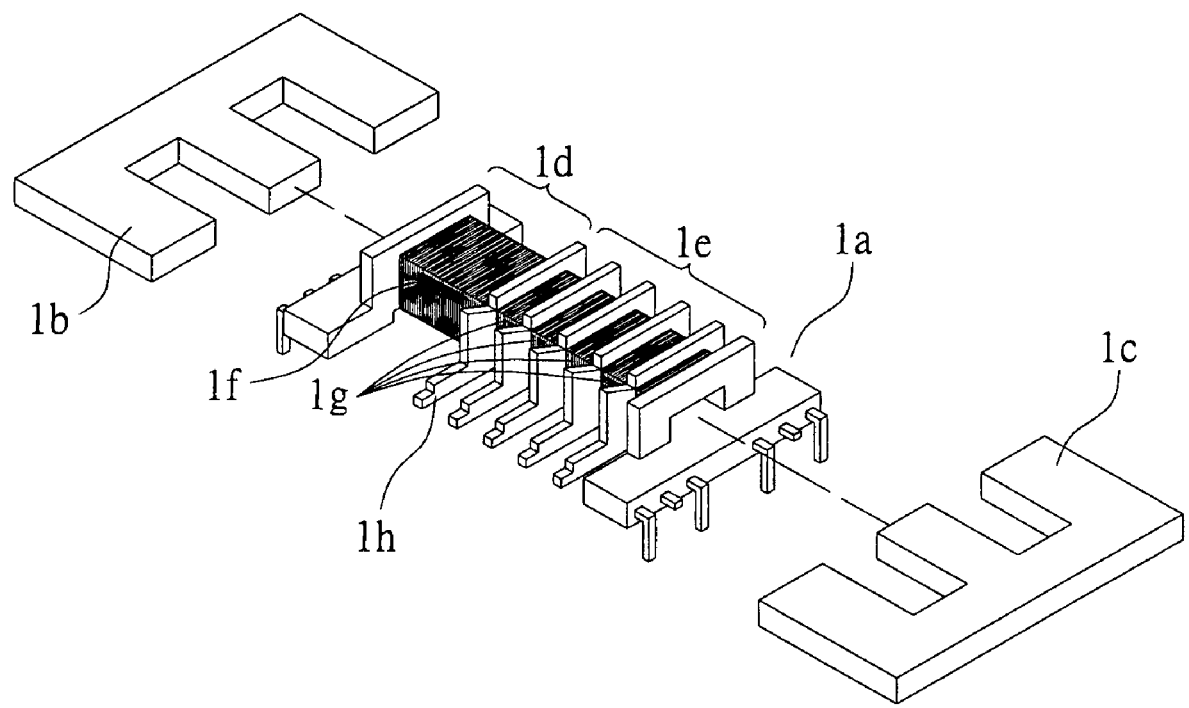
FIG. 1 is a diagram of a prior art high frequency transformer.
Figure 2:
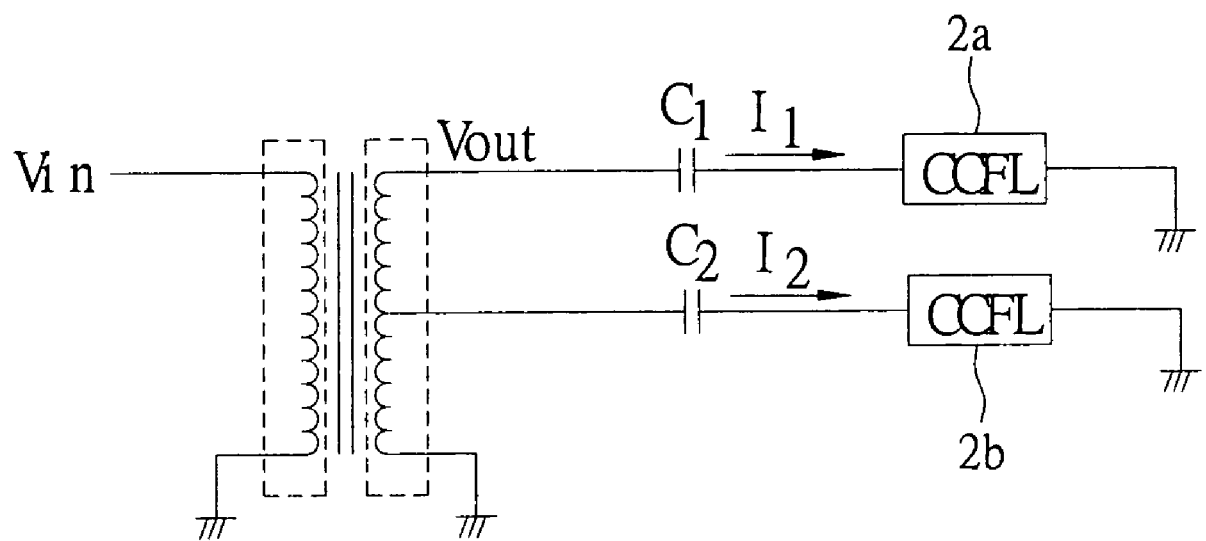
FIG. 2 is a diagram of an application drive circuit of a prior art high frequency transformer.
Figure 3A:
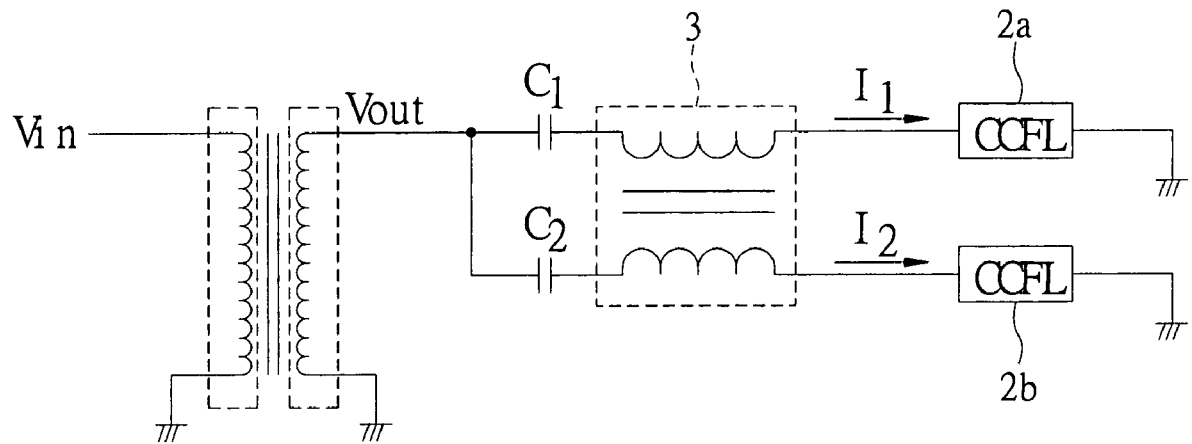
FIGS. 3A to 3C are diagrams of application drive circuits of a prior art high frequency transformer.
Figure 3B:
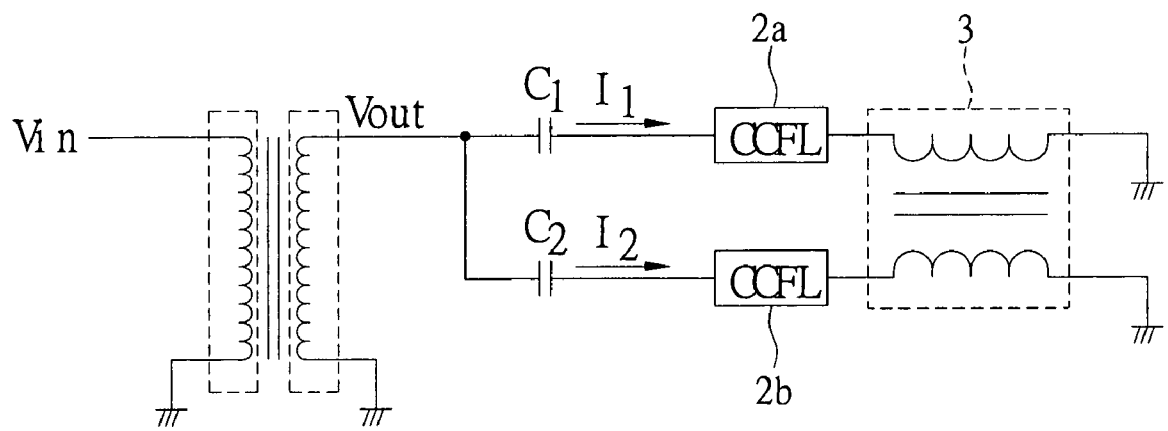
Figure 3C:
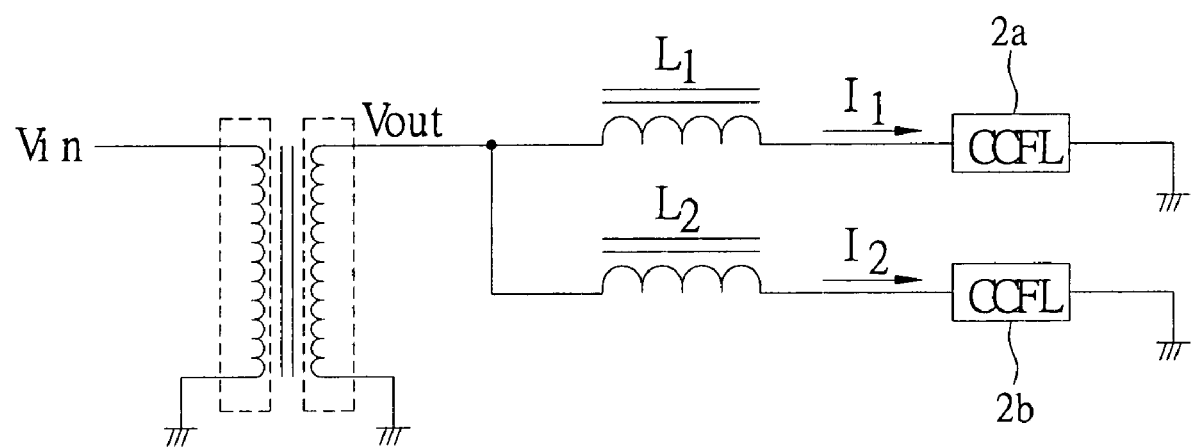
Figure 4:
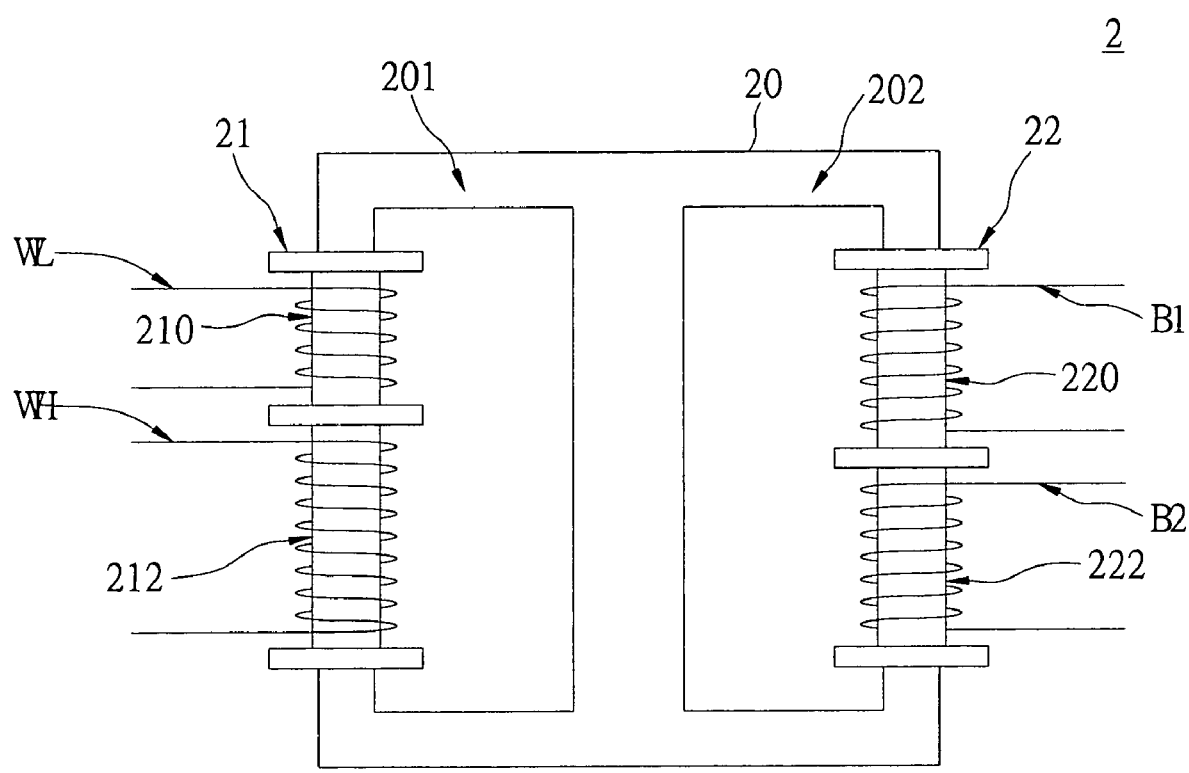
FIG. 4 is a structural diagram of a power transformer according to a first embodiment of the present invention.

As shown in FIG. 4, a power transformer combined with balance windings 2 comprises a ferrite core 20, a first bobbin 21 and a second bobbin 22. The ferrite core 20 has a first closed ferrite core 201 and a second closed ferrite core 202. The first closed ferrite core 201 and the second closed ferrite core 202 are coupled together. The first bobbin 21 has a first hollow through portion (not shown), a low voltage winding region 210 and a high voltage winding region 212. The first hollow through portion can receive a side bar of the first closed ferrite core 201. A low voltage winding WL is wound around the low voltage winding region 210. A high voltage winding WH is wound around the high voltage winding region 212. The second bobbin 22 has a second hollow through portion (not shown), a first winding region 220 and a second winding region 222. The second hollow through portion can receive a side bar of the second closed ferrite core 202. A first balance winding B1 is wound around the first winding region 220. A second balance winding B2 is wound around the second winding region 222.

Figure 5:
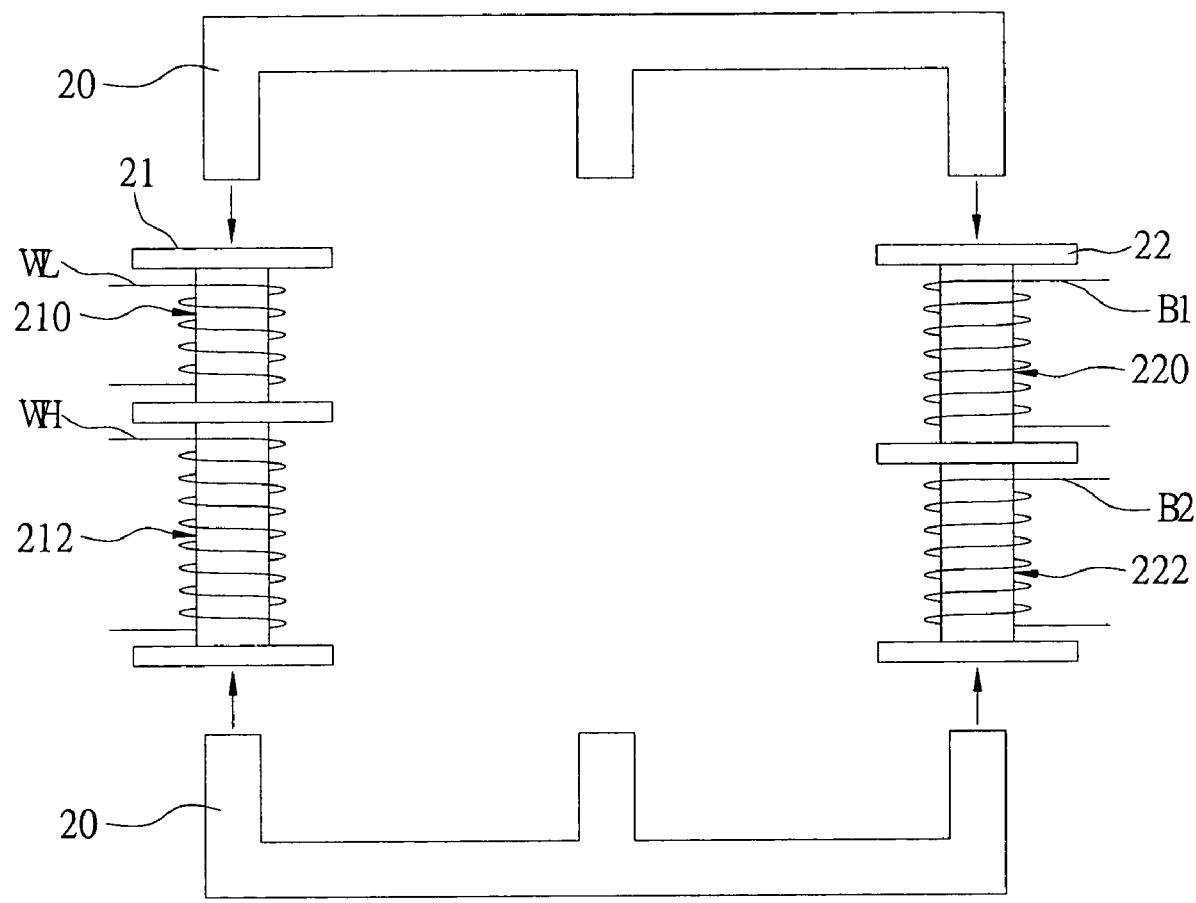
FIG. 5 is an exploded structure view of a power transformer utilizing two E-shaped ferrite cores of the present invention.
Figure 6:
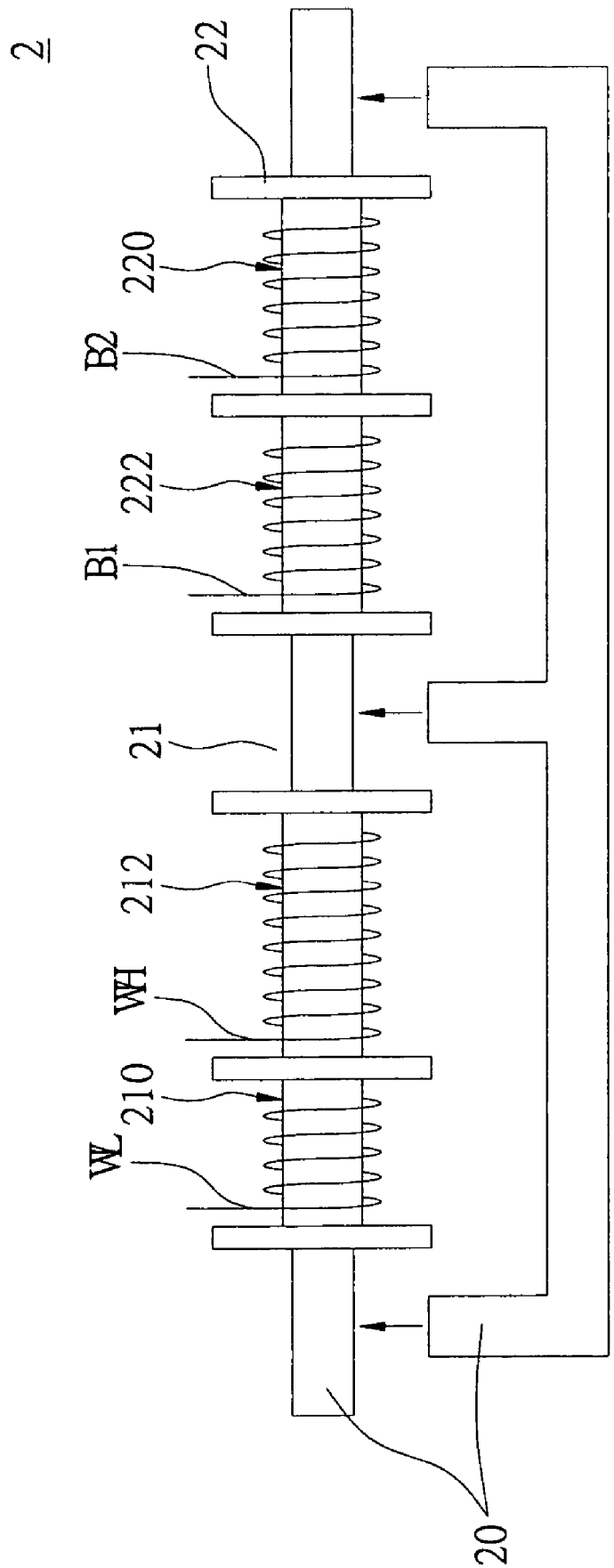
FIG. 6 is an exploded structure view of a power transformer utilizing an E-shaped ferrite core and an I-shaped ferrite core of the present invention.

Reference is made to FIG. 4 again. The low voltage winding WL is wound around the low voltage winding region 210 in a single-groove way. The high voltage winding region 212 has a plurality of separation grooves (not shown). The high voltage winding WH is wound around these separation grooves by means of separate winding to achieve the effect of voltage division. The first balance winding B 1 is wound around the first winding region 220 in a single-groove way or in a separate-groove way. The second balance winding B2 is wound around the second winding region 222 in a single-groove way or in a separate-groove way. The first balance winding B 1 and the second balance winding B2 have the same number of winding turns. The ferrite core 20 used in the power transformer combined with balance windings 2 can be composed of two E-shaped ferrite cores, as shown in FIG. 5. The ferrite core 20 used in the power transformer combined with balance windings 2 can also be composed of an E-shaped ferrite core and an I-shaped ferrite core, as shown in FIG. 6.

Figure 7:
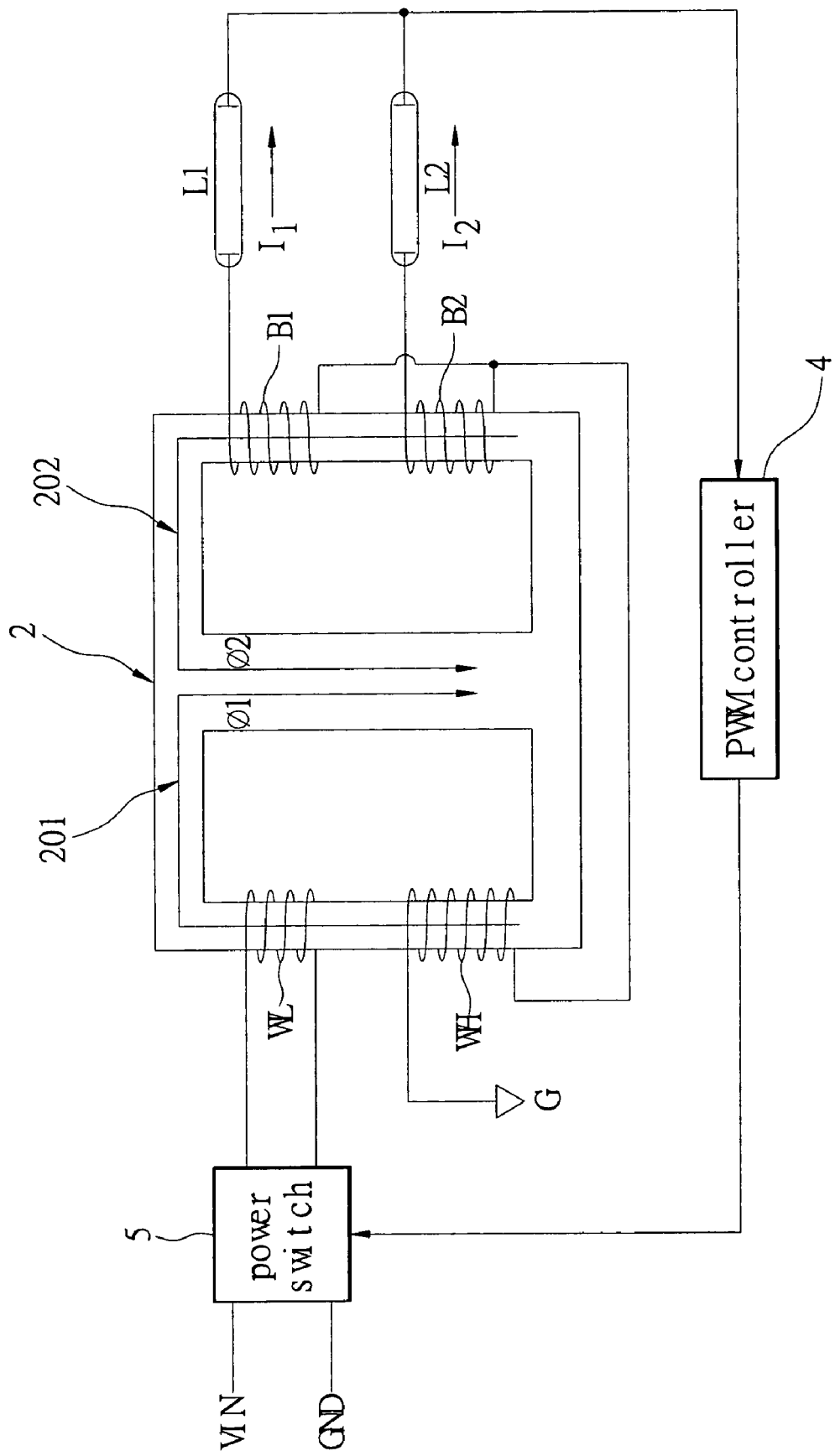
FIG. 7 is a diagram of an application circuit according to a first preferred embodiment of the present invention.

FIG. 7 is a diagram of an application circuit according to a first preferred embodiment of the present invention. The application circuit comprises a power transformer combined with balance windings 2, a PWM controller 4 and a power switch 5. The power transformer combined with balance windings 2 has a low voltage winding WL, a high voltage winding WH, a first balance winding B1 and a second balance winding B2. The high voltage winding WH is connected to the first balance winding B1 and the second balance winding B2. One terminal of the high voltage winding WH is connected to a reference terminal G, and the other terminal is connected to one terminal of the first balance winding B1 and the second balance winding B2. The other terminal of the first balance winding B1 and the second balance winding B2 are connected to one terminal of two CCFLs L1 and L2, respectively. The PWM controller 4 is connected to the other terminal of the two CCFLs L1 and L2 and receives a current signal from the two CCFLs L1 and L2 and outputs a modulation signal. The power switch 5 is connected to the PWM controller 4 and the low voltage winding WL. The power switch 5 is controlled by the modulation signal to periodically lead an input voltage VIN into the low voltage winding WL to keep lamp brightness uniform.

When power is introduced from the low voltage winding WL of the power transformer combined with balance windings 2, a magnetic flux φ1 is generated in the first closed ferrite core 201. At this time, the magnetic flux φ1 will be coupled to the high voltage winding WH via the first closed ferrite core 201 to produce a voltage on the high voltage winding WH. The power transformer combined with balance windings 2 can therefore acquire a voltage boost effect according to the turn ratio of the high voltage winding WH and the low voltage winding WL.

At the same time, the high voltage winding WH provides a voltage to the first balance winding B1 and the second balance winding B2 to produce currents on the first balance winding B1 and the second balance winding B2. The currents flowing through the first balance winding B1 and the second balance winding B2 will produce magnetic fluxes φ2 in the second closed ferrite core 202. The magnetic fluxes φ2 will induce each other in the second closed ferrite core 202 to balance the currents flowing through the two CCFLs L1 and L2 after the two CCFLs L1 and L2 are connected.

Therefore, the application circuit used to drive CCFLs of the present invention can provide stable induction voltages and balanced currents for the CCFLs L1 and L2 to enhance the luminous efficiency and uniformity of the CCFLs L1 and L2.

Figure 8:
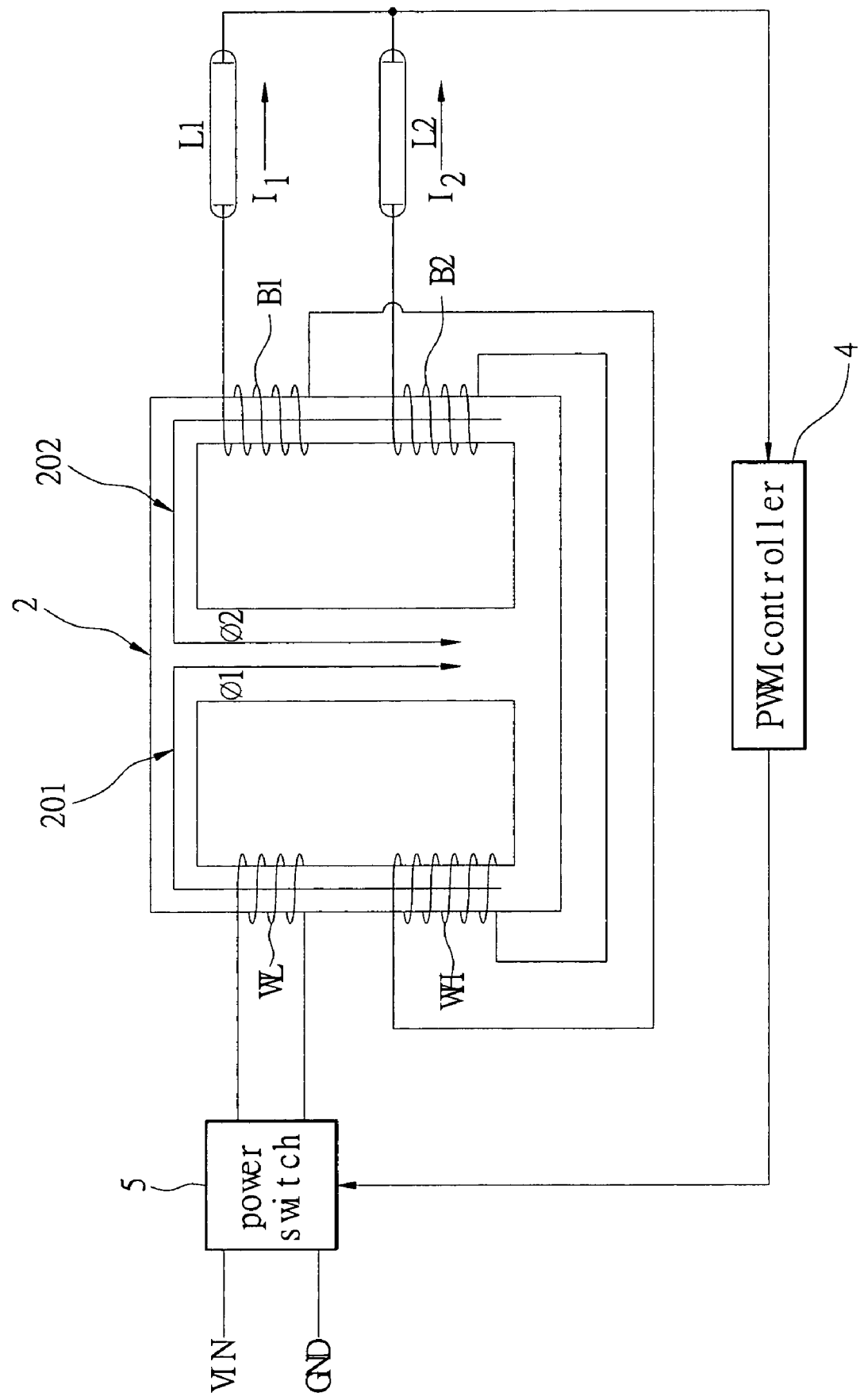
FIG. 8 is a diagram of an application circuit according to a second preferred embodiment of the present invention.

Reference is made to FIG. 8 as well as FIG. 7. FIG. 8 is a diagram of an application circuit according to a second preferred embodiment of the present invention. The application circuit comprises a power transformer combined with balance windings 2, a PWM controller 4 and a power switch 5. The second preferred embodiment differs from the first preferred embodiment in its method of circuit connection. Two terminals of a high voltage winding WH of the power transformer combined with balance windings 2 are connected to one terminal of a first balance winding B1 and a second balance winding B2, respectively. The other terminal of the first balance winding B1 and the second balance winding B2 are connected to one terminal of two CCFLs L1 and L2, respectively. The PWM controller 4 is connected to the other terminal of the two CCFLs L1 and L2 and receives a current signal from the two CCFLs L1 and L2 and outputs a modulation signal. The power switch 5 is connected to the PWM controller 4 and the low voltage winding WL. The power switch 5 is controlled by the modulation signal to periodically lead an input voltage VIN into the low voltage winding WL to keep lamp brightness uniform.

In the second preferred embodiment, the power transformer combined with balance windings 2 can also acquire a voltage boost effect according to the turn ratio of the high voltage winding WH and the low voltage winding WL. Moreover, currents I1 and I2 flowing through the two CCFLs L1 and L2 can be balanced through the first balance winding B I and the second balance winding B2.

Figure 9:
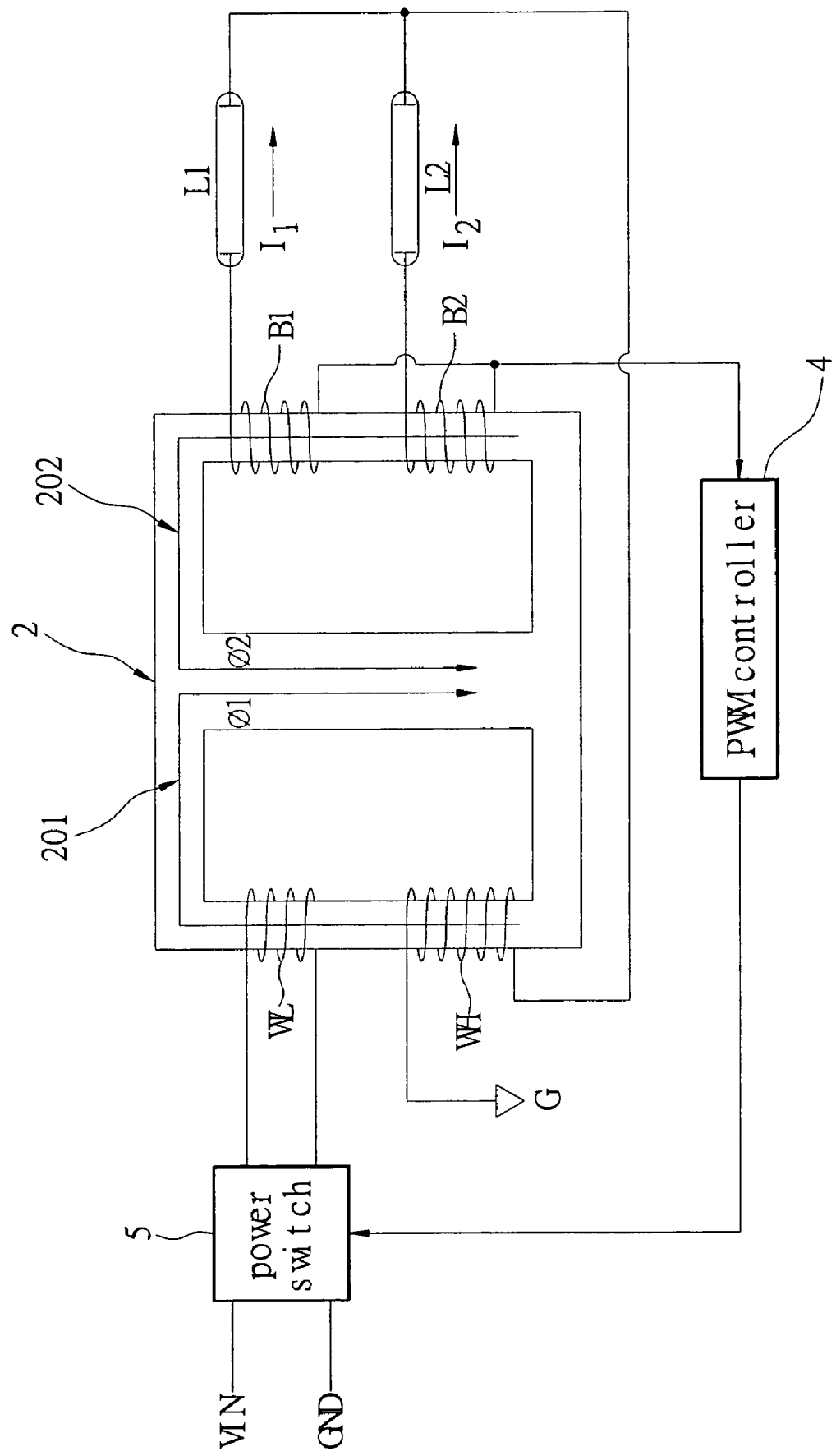
FIG. 9 is a diagram of an application circuit according to a third preferred embodiment of the present invention.

Reference is made to FIG. 9 as well as FIG. 7. FIG. 9 is a diagram of an application circuit according to a third preferred embodiment of the present invention. The application circuit comprises a power transformer combined with balance windings 2, a PWM controller 4 and a power switch 5. The third preferred embodiment differs from the first preferred embodiment in its method of circuit connection. One terminal of a high voltage winding WH of the power transformer combined with balance windings 2 is connected to a reference terminal G, and the other terminal is connected to one terminal of two CCFLs L1 and L2. The other terminal of the two CCFLs L1 and L2 are connected to one terminal of a first balance winding B1 and a second balance winding B2, respectively. The PWM controller 4 is connected to the other terminal of the first balance winding B1 and the second balance winding B2 and receives a current signal from the first balance winding B1 and the second balance winding B2 and outputs a modulation signal. The power switch 5 is connected to the PWM controller 4 and the low voltage winding WL. The power switch 5 is controlled by the modulation signal to periodically lead an input voltage VIN into the low voltage winding WL to keep lamp brightness uniform.

In the third preferred embodiment, the power transformer combined with balance windings 2 can also acquire a voltage boost effect according to the turn ratio of the high voltage winding WH and the low voltage winding WL. Moreover, currents I1 and I2 flowing through the two CCFLs L1 and L2 can be balanced through the first balance winding B1 and the second balance winding B2.

Figure 10:
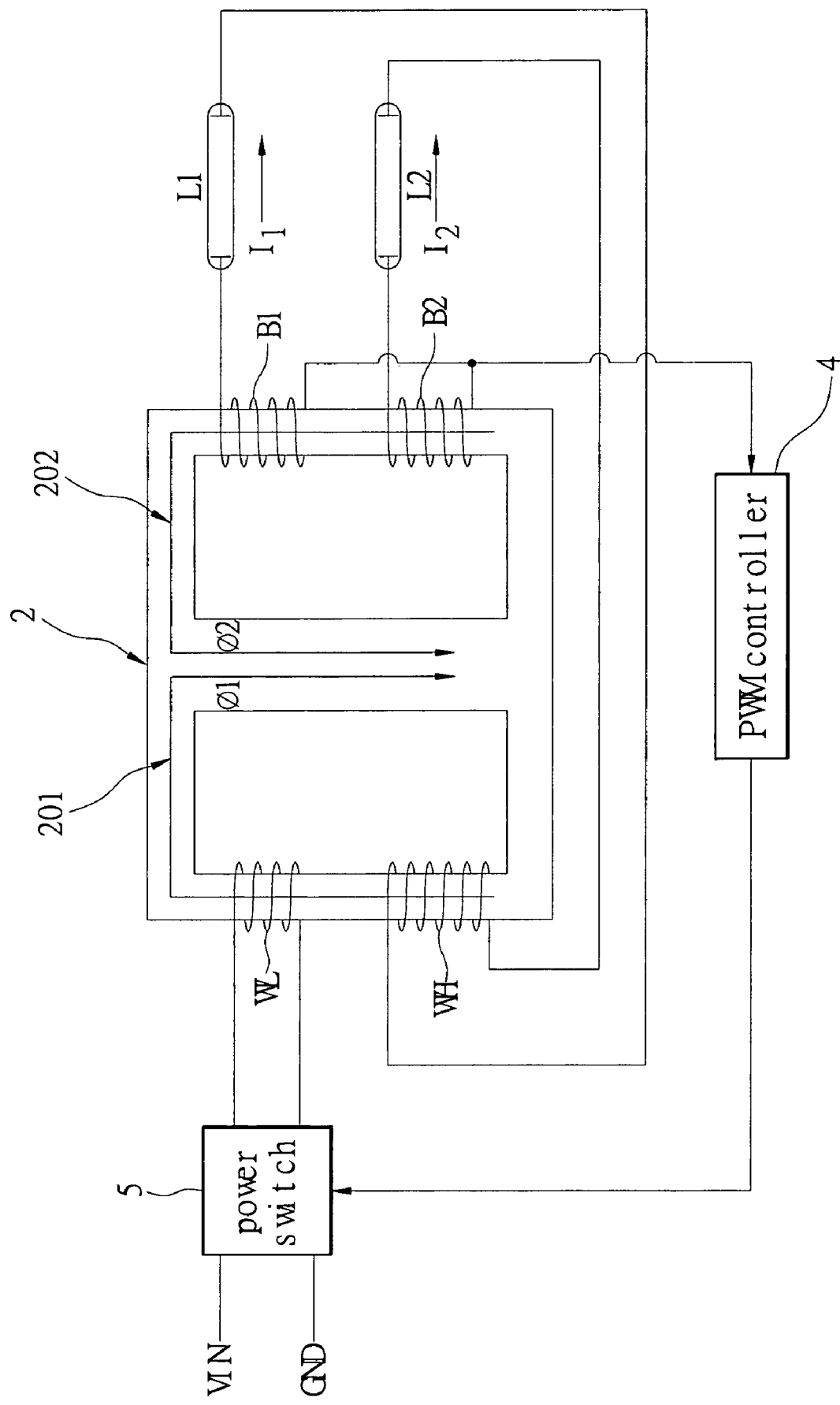
FIG. 10 is a diagram of an application circuit according to a fourth preferred embodiment of the present invention.

Reference is made to FIG. 10 as well as FIG. 7. FIG. 10 is a diagram of an application circuit according to a fourth preferred embodiment of the present invention. The application circuit comprises a power transformer combined with balance windings 2, a PWM controller 4 and a power switch 5. The fourth preferred embodiment differs from the first preferred embodiment in its method of circuit connection. Two terminals of a high voltage winding WH of the power transformer combined with balance windings 2 are connected to one terminal of two CCFLs L1 and L2. The other terminal of the two CCFLs are connected to one terminal of a first balance winding B1 and a second balance winding B2, respectively. The PWM controller 4 is connected to the other terminal of the first balance winding B1 and the second balance winding B2 and receives a current signal from the first balance winding B1 and the second balance winding B2 and outputs a modulation signal. The power switch 5 is connected to the PWM controller 4 and the low voltage winding WL. The power switch 5 is controlled by the modulation signal to periodically lead an input voltage VIN into the low voltage winding WL to keep lamp brightness uniform.

In the fourth preferred embodiment, the power transformer combined with balance windings 2 can also acquire a voltage boost effect according to the turn ratio of the high voltage winding WH and the low voltage winding WL. Moreover, currents I1 and I2 flowing through the two CCFLs L1 and L2 can be balanced through the first balance winding B1 and the second balance winding B2.

Figure 11:
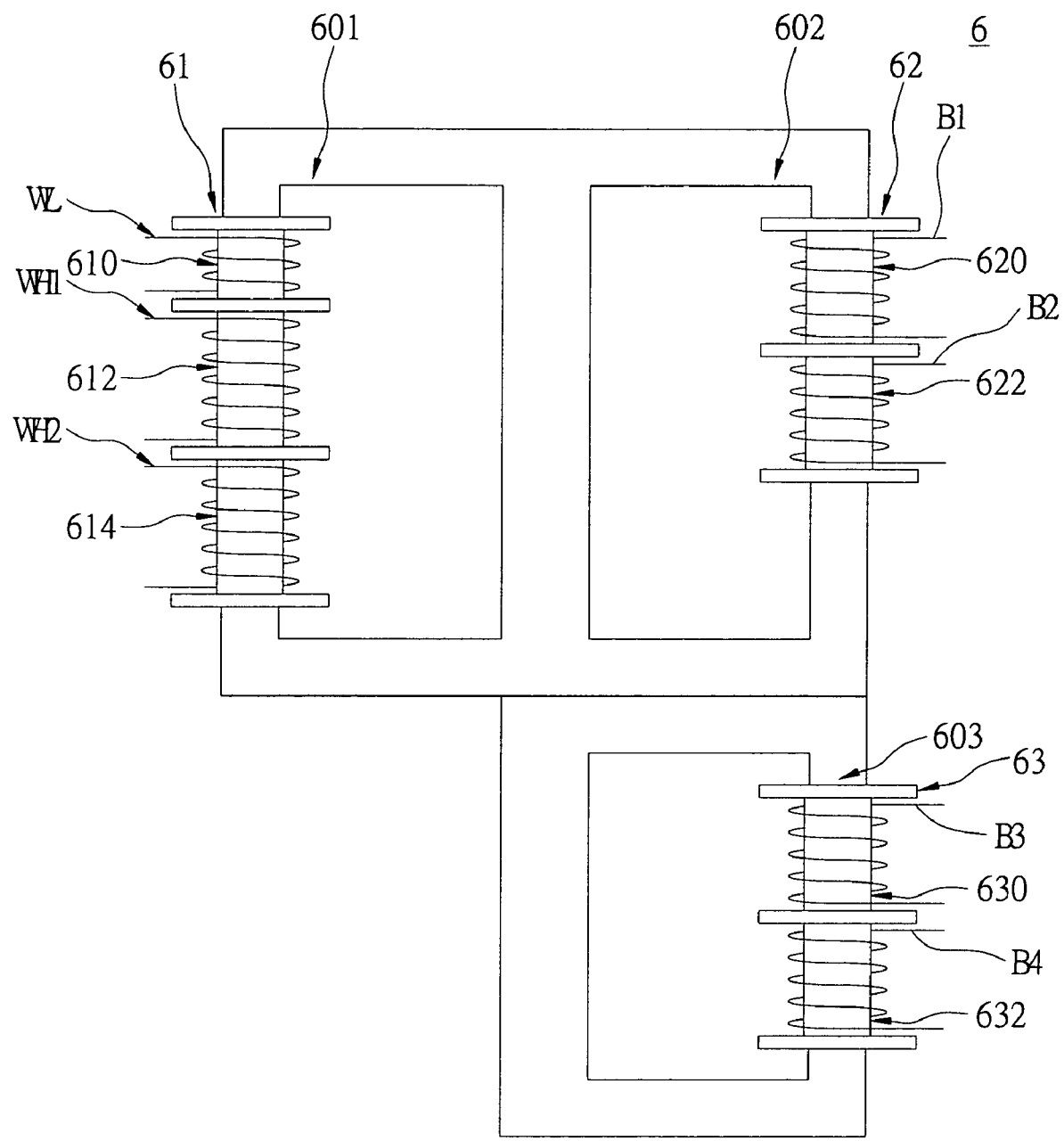
FIG. 11 is a structural diagram of a power transformer according to the second preferred embodiment of the present invention.

FIG. 11 is a structural diagram of a power transformer according to the second preferred embodiment of the present invention. The power transformer 6 is based on the same working principle and has the same method of winding as the power transformer 2. The power transformer is an extended structure of the power transformer 2, and is used for several CCFLs. The power transformer combined with balance windings 6 comprises a first closed ferrite core 601, two second closed ferrite cores 602 and 603, a first bobbin 61 and two second bobbins 62 and 63. The two second closed ferrite cores 602 and 603 are coupled with the first closed ferrite core 601. The first bobbin 61 has a first hollow through portion (not shown), a low voltage winding region 610 and two high voltage winding regions 612 and 614. The first hollow through portion can receive a side bar of the first closed ferrite core 601. A low voltage winding WL is wound around the low voltage winding region 610. High voltage windings WH1 and WH2 are wound around the high voltage winding regions 612 and 614, respectively. Each second bobbin 62 (63) has a second hollow through portion (not shown), a first winding region 620 (630) and a second winding region 622 (632). The second hollow through portions can receive side bars of the second closed ferrite cores 62 and 63, respectively. First balance windings B1 and B3 are wound around the first winding regions 620 and 630, respectively. Second balance windings B2 and B4 are wound around the second winding regions 622 and 632.

Figure 12:
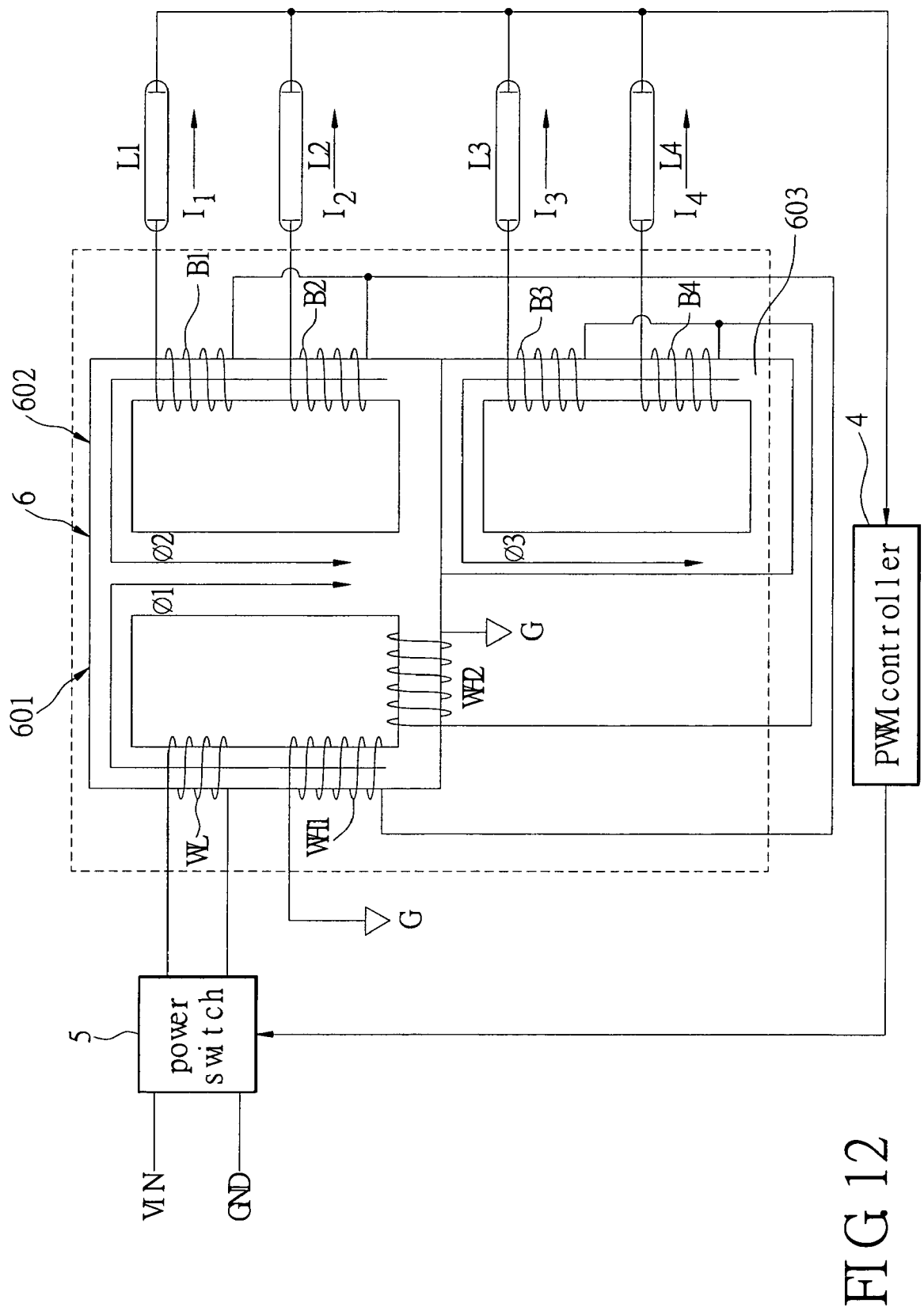
FIG. 12 is a diagram of an application circuit according to a fifth preferred embodiment of the present invention.

Reference is made to FIG. 12 as well as FIG. 11. FIG. 12 is a diagram of an application circuit according to a fifth preferred embodiment of the present invention. The application circuit comprises a power transformer combined with balance windings 6 shown in FIG. 11, a PWM controller 4 and a power switch 5. One terminal of the high voltage windings WH1 and WH2 of the power transformer combined with balance windings 6 is connected to a reference terminal G, and the other terminal is connected to one terminal of the first balance windings B1 and B3 and one terminal of the second balance windings B2 and B4 on the second bobbins 62 and 63, respectively. The other terminals of the balance windings B1, B2, B3 and B4 are connected to CCFLs L1, L2, L3 and L4, respectively. The PWM controller 4 is connected to the CCFLs L1, L2, L3 and L4 and receives a current signal from the CCFLs L1, L2, L3 and L4 and outputs a modulation signal. The power switch 5 is connected to the PWM controller 4 and the low voltage winding WL. The power switch 5 is controlled by the modulation signal to periodically lead an input voltage VIN into the low voltage winding WL to keep lamp brightness uniform.

When power is introduced from the low voltage winding WL of the power transformer combined with balance windings 6, a magnetic flux $\phi1$ is generated in the first closed ferrite core 601. At this time, the magnetic flux $\phi1$ will be coupled to the high voltage windings WH1 and WH2 via the first closed ferrite core 601 to produce voltages on the high voltage windings WH1 and WH2. The power transformer combined with balance windings 6 can therefore acquire a voltage boost effect according to the turn ratios of the high voltage windings WH1 and WH2 and the low voltage winding WL.

At the same time, the high voltage windings WH1 and WH2 provide voltages to the first balance windings B1 and B3 and the second balance windings B2 and B4 to produce currents on the first balance windings B1 and B3 and the second balance windings B2 and B4. The currents flowing through the first balance windings B1 and B3 and the second balance windings B2 and B4 will produce magnetic fluxes $\phi2$, $\phi3$ in the second closed ferrite cores 602 and 603. The magnetic fluxes $\phi2$ and $\phi3$ will induce each other in the second closed ferrite cores 602 and 603 to balance the currents flowing through the CCFLs L1, L2, L3 and L4 after the CCFLs L1, L2, L3 and L4 are connected.

Therefore, the application circuit used to drive CCFLs of the present invention can provide stable induction voltages and balanced currents for the CCFLs L1 and L2 to enhance the luminous efficiency and uniformity of the CCFLs L1 and L2.

Figure 13:
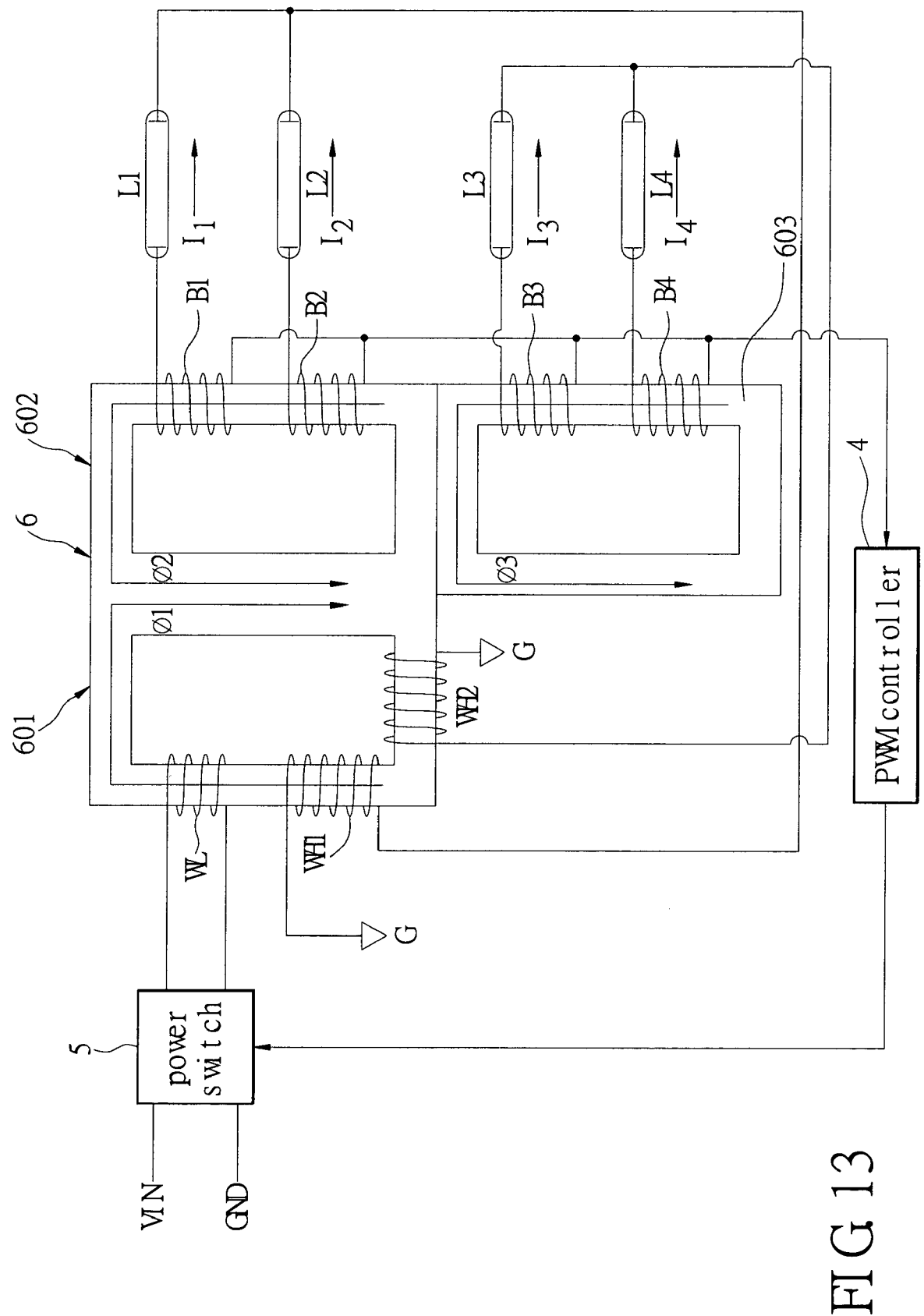
FIG. 13 is a diagram of an application circuit according to a sixth preferred embodiment of the present invention.

FIG. 13 is a diagram of an application circuit according to a sixth preferred embodiment of the present invention. The application circuit comprises a power transformer combined with balance windings 6, a PWM controller 4 and a power switch 5. The sixth preferred embodiment differs from the fifth preferred embodiment in its method of circuit connection. The high voltage windings WH1 and WH2 of the power transformer combined with balance windings 6 are connected to one terminal of CCFLs L1, L2, L3 and L4. The other terminal of the CCFLs L1, L2, L3 and L4 are connected to the first balance windings B1 and B3 and the second balance windings B2 and B4. The PWM controller 4 is connected to the first balance windings B1 and B3 and the second balance windings B2 and B4 and receives a current signal from the first balance windings B1 and B3 and the second balance windings B2 and B4 and outputs a modulation signal. The power switch 5 is connected to the PWM controller 4 and the low voltage winding WL. The power switch 5 is controlled by the modulation signal to periodically lead an input voltage VIN into the low voltage winding WL to keep lamp brightness uniform.

To sum up, the power transformer provided by the present invention makes use of ferrite core structure to achieve the characteristics of closed magnetic circuits and combines balance windings therein. When used in an application circuit, the power transformer combined with balance windings can provide stable induction voltages and balanced load currents to CCFLs to enhance the luminous efficiency and uniformity of the CCFLs. Therefore, the present invention can effectively improve the drawbacks of a nonuniform current flowing through the CCFLs and a too high a manufacturing cost of conventional CCFL application circuits.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power transformer combined with balance windings and used for driving CCFLs, said power transformer comprising:

a ferrite core having a first closed ferrite and a second closed ferrite coupled together;

a first bobbin having a first hollow through portion, a low voltage winding region and a high voltage winding region, said first hollow through portion being able to receive a side bar of said first closed ferrite, a low voltage winding being wound around said low voltage winding region, a high voltage winding being wound around said high voltage winding region; and a second bobbin having a second hollow through portion, a first winding region and a second winding region, said second hollow through portion being able to receive a side bar of said second closed ferrite, a first balance winding being wound around said first winding region and coupled to a first CCFL, a second balance winding being wound around said second winding region and coupled to a second CCFL.

2. The power transformer combined with balance windings as claimed in claim 1, wherein said ferrite cores are composed of two E-shaped ferrite cores.

3. The power transformer combined with balance windings as claimed in claim 1, wherein said ferrite cores are composed of an E-shaped ferrite core and an I-shaped ferrite core.

4. The power transformer combined with balance windings as claimed in claim 1, wherein said low voltage winding is wound around said low voltage winding region in a single-groove way.

5. The power transformer combined with balance windings as claimed in claim 1, wherein said high voltage winding region has a plurality of separation grooves, and said high voltage winding is wound around said separation grooves by means of separate winding to achieve the effect of voltage division.

6. The power transformer combined with balance windings as claimed in claim 1, wherein said first balance winding is wound around said first winding region in a single-groove way or in a separate-groove way.

7. The power transformer combined with balance windings as claimed in claim 1, wherein said second balance winding is wound around said second winding region in a single-groove way or in a separate-groove way.

8. The power transformer combined with balance windings as claimed in claim 1, wherein said first balance winding and said second balance winding have the same number of winding turns.

9. An application circuit utilizing the transformer as claimed in claim 1 to drive CCFLs, said application circuit comprising: a power transformer combined with balance windings and having a low voltage winding, a high voltage winding, a first balance winding and a second balance winding, said high voltage winding being connected to said first balance winding and said second balance winding, said first balance winding and said second balance winding being connected to two CCFLs; a PWM controller connected to said two CCFLs and receiving a current signal from said two CCFLs and outputting a modulation signal; and a power switch connected to said PWM controller and said low voltage winding, said power switch being controlled by said modulation signal to periodically lead an input voltage into said low voltage winding to keep lamp brightness uniform.

10. An application circuit utilizing the transformer as claimed in claim 1 to drive CCFLs, said application circuit comprising: a power transformer combined with balance windings and having a low voltage winding, a high voltage winding, a first balance winding and a second balance winding, said high voltage winding being connected to two CCFLs, and said two CCFLs being connected to said first balance winding and said second balance winding; a PWM controller connected to said first balance winding and said second balance winding and receiving a current signal from said first balance winding and said second balance winding and outputting a modulation signal; and a power switch connected to said PWM controller and said low voltage winding, said power switch being controlled by said modulation signal to periodically lead an input voltage into said low voltage winding to keep lamp brightness uniform.

11. A power transformer combined with balance windings and used for driving CCFLs, said power transformer comprising: a first closed ferrite core; at least a second closed ferrite core coupled with said first closed ferrite core; a first bobbin having a first hollow through portion, a low voltage winding region and at least a high voltage winding region, said first hollow through portion being able to receive a side bar of said first closed ferrite core, a low voltage winding being wound around said low voltage winding region, a high voltage winding being wound around each said high voltage winding region; and at least a second bobbin each having a second hollow through portion, a first winding region and a second winding region, each said second hollow through portion being able to receive a side bar of one of said second closed ferrite cores, a first balance winding being wound around each said first winding region, a second balance winding being wound around each said second winding region.

12. An application circuit utilizing the transformer as claimed in claim 11 to drive CCFLs, said application circuit comprising: a power transformer combined with balance windings and having a low voltage winding, at least a high voltage winding, at least a first balance winding and at least a second balance winding, each said high voltage winding being connected to said first balance winding and said second balance winding wound around the same second bobbin and then to two CCFLs; a PWM controller connected to said two CCFLs and receiving a current signal from said two CCFLs and outputting a modulation signal; and a power switch connected to said PWM controller and said low voltage winding, said power switch being controlled by said modulation signal to periodically lead an input voltage into said low voltage winding to keep lamp brightness uniform.

13. An application circuit utilizing the transformer as claimed in claim 11 to drive CCFLs, said application circuit comprising: a power transformer combined with balance windings and having a low voltage winding, at least a high voltage winding, at least a first balance winding and at least a second balance winding, each said high voltage winding being connected to two CCFLs and then to said first balance winding and said second balance winding that are wound around the same second bobbin; a PWM controller connected to said first balance winding and said second balance winding and receiving a current signal from said first balance winding and said second balance winding and outputting a modulation signal; and a power switch connected to said PWM controller and said low voltage winding, said power switch being controlled by said modulation signal to periodically lead an input voltage into said low voltage winding to keep lamp brightness uniform.

* * * * *